Figure 1:
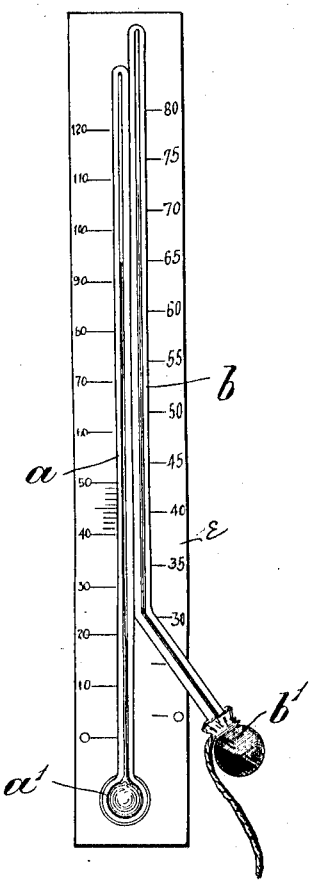

H. H. S. CUNYNGHAME.
HYGROSCOPE.
APPLICATION FILED JAN. 26, 1911.

1,019,767.

Patented Mar. 12, 1912.

Witnesses
John Herrick
R. H. Bishop

Inventor
Henry H. S. Cunynghame
By Julius C. Dowell
his Attorney

UNITED STATES PATENT OFFICE.

HENRY HARDINGE SAMUEL CUNYNGHAME, OF NUTFIELD, ENGLAND.

HYGROSCOPE.

1,019,767.  Specification of Letters Patent.  Patented Mar. 12, 1912.

Application filed January 26, 1911. Serial No. 604,871.

*To all whom it may concern:*

Be it known that I, HENRY HARDINGE SAMUEL CUNYNGHAME, K. C. B., a subject of the King of Great Britain and Ireland, residing at Nutfield, in the county of Surrey, England, have invented Improvements in Hygroscopes, of which the following is a specification.

This invention relates to a hygroscope whereby it can be seen by inspection, without reference to tables, whether at the moment of taking the observation the water vapor contained in the atmosphere exceeds or falls below some definite specified proportion of the quantity necessary to saturate it at the time the observation is made; or, alternatively, whether at the time of observation the water vapor contained in the atmosphere exceeds or falls below some definite specified weight in a cubic foot or meter thereof. The instrument can be constructed so as to show the above information, within the ranges of observation usual to hygrometers for any proportions desired, as for example " 60 per cent. of humidity," or " 2 grains to the cubic foot." These methods of expressing humidity are well understood and in common use at the present time. The instrument is intended by this means to enable an observer to predict frost, or to tell whether a room, factory or other place in doors or out of doors is in such a condition as to dryness or dampness as he desires. For this purpose according to one way of carrying out the invention two thermometers of ordinary form, consisting of bulbs and stems of glass containing mercury or other liquid, similar to those used in the well known wet and dry bulb hygrometer, are placed with their stems in close juxtaposition, the stem of one or both being, when necessary, bent to allow the stems to be arranged close together side by side. One of them is arranged as a wet bulb thermometer with a piece of damp cloth or other means of cooling it by the evaporation of water. The other is a dry bulb thermometer. The graduation of the stems of the two thermometers is however not identical as to the size of division corresponding to a degree. Nor is the size of the divisions of each thermometer a matter of indifference. On the contrary, the relative sizes of the divisions are in the two instruments carefully regulated in a proportion to be hereinafter described, and the stems are put vertically in juxtaposition in a certain manner also to be hereinafter described. Thus arranged, all the observer has to do, in making his observation, is, without necessarily noting the temperature reading of either thermometer, simply to observe whether the top of the column of liquid in the stem of the one does or does not stand horizontally above the top of the column of liquid in the stem of other. The division of the stems of the thermometers and the relative positions of the stems when placed along side each other, are arranged to correspond with the purpose for which the instrument is to be used. For example, let it be supposed that it is desired to make a frost predictor. When the temperature of the air out of doors is low, and at the same time the quantity of water-vapor in the air is below about 2.4 grains to the cubic foot, the amount of water vapor in the air will be too small to check a heavy radiation of heat from the earth and therefore a frost may be expected. Now when in an ordinary wet and dry bulb hygrometer, the wet bulb reads 37° F. and the dry bulb reads 38° F., the amount of water vapor present in the air is very nearly 2.4 grains to the cubic foot. Again, when the wet bulb reads 45° F. (or eight degrees higher than before) and the dry bulb reads 54° F. (or 16 degrees higher than before) the amount of water vapor in the air is also very nearly 2.4 grains to the cubic foot, and for any proportionately intermediate figures such as 40° F. of the wet bulb (or 3 degrees higher than the first mentioned temperature) and 44° F. of the dry bulb (or 6 degrees higher than the first mentioned temperature), the quantity of water vapor present is also very nearly 2.4 grains to the cubic foot. Accordingly, if two thermometers whose stems are in juxtaposition be so constructed that the divisions indicating a degree of difference of temperature on the wet bulb thermometer stem are uniform and just double the size of the divisions indicating a degree of difference of temperature on the uniformly divided stem of the dry bulb, it follows of course that if the stems (placed vertically) are so put together that the 44° F. division on the dry bulb is horizontally opposite the 40° F. division on the wet bulb, then 54° F. on the dry bulb will be opposite 45° F. on the wet bulb. It will also follow (as may be verified by reference to any hygrometrical tables) that in each case, between the limits of about 35° F. and 56° F., when the column of liquid in the dry bulb thermometer is at the same horizontal level as that in the wet bulb thermometer, no matter what the actual temperature indicated by the respective thermometers may be, the water vapor present in the air will be very nearly 2.4 grains to the cubic inch. Whence then, if the horizontal level of the liquid in the stem of the wet bulb thermometer is below the horizontal level of the liquid in the stem of the dry bulb thermometer, it is a sign that there is less water vapor in the air than 2.4 grains to the cubic foot, and a frost will probably ensue. Simple inspection will tell this at a glance, and it is not necessary visibly to mark the graduations on the two stems if only they are in reality duly constructed, and duly put into proper juxtaposition as above described. Of course in practice it is not essential that the thermometer stems should be placed vertically for use; they may be put in any position but the levels or surfaces of the tops or free ends of the columns of liquid must of course be observed perpendicularly to the length of the stems.

As above described, the invention is used with thermometers made of a liquid inclosed in glass tubes but it is obvious that thermometers made with expansible solids may also be used provided that the co-efficient of expansion in each thermometer is tolerably uniform at different temperatures. An instrument on this plan is hereinafter described and shown in the drawings. It is also evident that the use of the invention is not confined to frost prediction. In a manner precisely similar to that above described in detail and with the aid of the usual hygrometrical tables, an instrument can be made to indicate any desired degree of moisture whether it be expressed as a given proportion of saturation, or as a given weight of water vapor in a given volume of air. An instrument of this character very useful in cotton cloth factories, is hereinafter described and by the use of the methods explained above may easily be constructed to suit any desired conditions.

Figure 2:
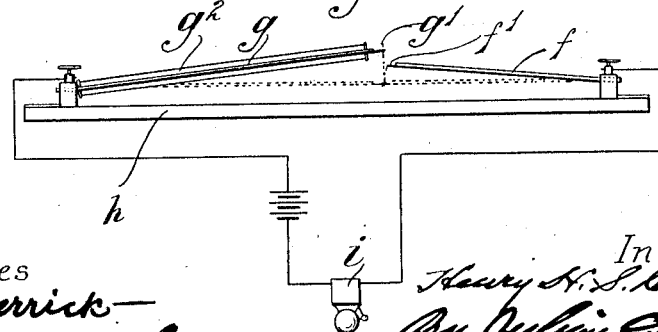

In the accompanying illustrative drawings, Figure 1 shows diagrammatically, in front elevation, a hygroscope constructed according to the present invention and designed to afford, by visual examination, when a given ratio of dryness or humidity of the atmosphere has been reached, the instrument being suitable for indicating when a frost may be expected. Fig. 2 is a similar view to Fig. 1 showing a modified arrangement.

In Fig. 1, $a$ is a thermometer made of a glass stem and bulb charged with a liquid and having a dry bulb $a^1$, and $b$ is a second thermometer also made of a glass stem and bulb charged with a liquid having a wet bulb $b^1$. In this example, the two instruments are so graduated that each division or portion of the tube corresponding to 1° F. on the dry bulb stem $a$ is half the length of a division or tube portion corresponding to 1° F. on the wet bulb stem $b$. The two thermometers are put in juxtaposition on a board or carrier $e$ so that the mark indicating 40° F. on the wet bulb stem $b$ is put opposite the mark indicating 44° F. on the dry bulb stem $a$. If then within the range of about 35° F. to 56° F. of the dry bulb reading, the column of fluid in the wet bulb stem $b$ sinks below the horizontal level, not the thermometric level of that in the dry bulb stem, there will be less than about 2.4 grains of water to the cubic foot of air, and a frost may be expected. The stems of the two thermometers $a$ and $b$ may simply have marks corresponding to 44° F. and 40° F. respectively, or each may be provided with a scale of degrees. It will thus be seen that to use the instrument, it is not necessary to observe whether one thermometer has a higher or lower reading in thermometric degrees than the other. The only point to observe is whether the top of the liquid in the wet bulb instrument is horizontally below the top of the liquid in the dry bulb instrument. Sometimes to suit the climatic characteristics of different countries the two tubes may be so calibrated or graduated that the relative lengths of the divisions may be varied a little from that above mentioned so as to make 1° F. on the dry bulb $a$ correspond say to 11-20ths of a degree on the wet bulb stem $b$. In either case the indication is sufficiently approximate to be practically useful. The invention is however not limited to any exact ratio. Again, it may be desired to make an instrument to show when the air of a room contains more than a given percentage of moisture, say 78% of saturation. To do this, dry and wet bulb thermometers are used as described, so calibrated that thirty three Fahrenheit degree divisions on the dry bulb thermometer stem correspond to thirty two Fahrenheit degree divisions on the wet bulb thermometer stem, and the two thermometer stems placed in juxtaposition so that the mark or division corresponding to 67° F. on the dry bulb stem stands opposite the mark or division corresponding to 63° F. on the wet bulb stem. Then, whenever the fluid in the wet bulb stem rises thermometrically above that in the dry bulb stem this will indicate that the limit of 78% of moisture will (approximately) have been exceeded. These positions are of course only approximate, but they are sufficiently true for practical and commercial purposes and any instrument may easily be made on this plan by the use of hygrometrical tables such as the well-known tables of Glaisher, or again by the use of the well-known hygrometrical formulæ.

It is obvious that the method of indicating the humidity of the atmosphere described is equally applicable to the expansion of solids and to thermometers constructed on the principle of expansion of solids. Fig. 2 shows an instrument of this kind. In this example, two thermometers $f$ and $g$ are used each composed of two or more strips of compounded metals, in the manner usually employed for thermometers of this type, having different co-efficients of expansion and provided with a pointer or index $f^1$ or $g^1$. The two thermometers are each fixed at one end to a base or support $h$ and the thermometer $g$ is provided with a covering $g^2$ of absorbent material such as textile fabric that is kept continuously moistened with water like the wet bulb $b^1$ of the instrument shown in Fig. 1. The two thermometers $f$ and $g$ are made of such relative length that in the case of an instrument designed to indicate when frost may be expected, the index $f^1$ of the thermometer $f$ will move through about half the distance for each degree Fahrenheit that the index $g^1$ of thermometer $g$ will move, as in the instrument shown in Fig. 1, so that when the two indices $f^1$, $g^1$ come into line, as indicated in dotted lines, a frost may be expected. When this takes place, the indices, which may be made of spring metal, can be caused to complete an electric circuit and cause an indication or signal to be given, for example, to set an electric bell $i$ in action.

What I claim is:—

1. A hygroscope adapted to indicate by simple inspection, the presence of a specified degree of moisture in the air, comprising a dry thermometer adapted to indicate the temperature of the air and a wet thermometer adapted to indicate the temperature of evaporating liquid in the air, the movable element of the wet thermometer having a movement bearing a substantially fixed ratio, different from unity, to the movement of the movable element of the dry thermometer for each degree of variation of temperature, the movable elements of the two thermometers being arranged adjacent to each other and so that the free end of the movable element of the wet thermometer, corresponding to some specified degree of temperature, will coincide in position with that of the movable element of the dry thermometer when the specified degree of moisture in the air obtains, substantially as described for the purpose specified.

2. A hygroscope adapted for frost indication, comprising dry and wet bulb thermometers of which the liquid column of the wet bulb thermometer has a movement equal substantially to twice that of the dry bulb thermometer for each degree of variation of temperature, the stems of the two thermometers being arranged adjacent to each other and so that the level of the liquid column of the wet bulb thermometer corresponding to 40° F. will coincide with that of the liquid in the dry bulb thermometer corresponding to 44° F., substantially as described for the purpose set forth.

Signed at London, England, this sixteenth day of January 1911.

HENRY HARDINGE SAMUEL CUNYNGHAME.

Witnesses:
RIPLEY WILSON,
C. P. LIDDON.